United States Patent

[11] 3,588,549

| | | |
|---|---|---|
| [72] | Inventor | Hans-Joachim Buch<br>Kaufbeuren, Germany |
| [21] | Appl. No. | 877,215 |
| [22] | Filed | Nov. 17, 1969 |
| [45] | Patented | June 28, 1971 |
| [73] | Assignee | Walther-Buromaschinen GmbH<br>Gerstetten-Wurtt, Germany |
| [32] | Priority | Nov. 23, 1968 |
| [33] | | Germany |
| [31] | | P 18 10 613.3 |

[54] MAGNETIC ELECTRIC SWITCH WITHOUT CONTACTS
5 Claims, 6 Drawing Figs.

[52] U.S. Cl. .................................................. 307/309,
307/218, 307/314, 336/110
[51] Int. Cl. ....................................................... H01r 5/0,
H01f 21/00
[50] Field of Search ............................................ 307/314,
319, 309; 336/110

[56] References Cited
UNITED STATES PATENTS
2,000,378 5/1935 Deisch ........................... 336/110
3,010,089 11/1961 Pierce et al. .................. 336/110
3,127,522 3/1964 Thorndyke .................... 307/314

*Primary Examiner*—Stanley D. Miller, Jr.
*Assistant Examiner*—B. P. Davis
*Attorney*—Edmund M. Jaskiewicz

ABSTRACT: A magnetic electric switch without contacts has a driver stage generating a pulsed current to a coil of a switch element with an output amplifier being also connected to the coil through a diode and capacitor. The switch element coil is around a ferromagnetic core and a permanent magnet establishes a magnetic field blocking magnetically the core. The switch element also has a second permanent magnet displaceable toward and away from the first permanent magnet with its magnetic poles oppositely disposed from the poles of the first magnet so that movement of the second magnet toward the first magnet counteracts the blocking magnetic field and the amplifier is charged through the capacitor into the ON state. The second magnet is moved away from the first magnet so that the core again becomes magnetically blocked and the amplifier output indicates an OFF state.

INVENTOR:

Hans-Joachim Bröp

MAGNETIC ELECTRIC SWITCH WITHOUT CONTACTS

The present invention relates to an electric switch, more particularly, to a high-speed magnetic electric switch which does not have any contacts.

Many electronic applications require electric switches that have high-speed switching action and at the same time provide maximum reliability and safety in operation. Such switches should also be characterized by an almost instantaneous switching action so that the switching from one state to another occurs in as short a time as possible and the transition between these two states is abrupt and clearly defined. It is also desired to avoid such phenomena as contact chatter during the switching action from one state to another. In order to obtain a high-speed switch it is necessary that the moving components have low mass inertia and that the forces required to actuate the switch are very small.

It has not been possible to devise a mechanically actuated electric switch having contacts which embodies all of the desired characteristics as set forth above. In an attempt to perform switching operations in fulfillment of the above characteristics other devices have been proposed for switching operations. Such devices have generally been of an electronic-mechanical or electronic-optical nature. Such switching devices have generally employed magnetodynamic, electrostatic, photoelectric and magnetostatic principles.

A switching device embodying the magnetostatic principle generally comprises a structural component responsive to a magnetic field, such as magnetic field plates or magnetic Hall probes whose electrical resistance varies under the effect of an external magnetic field. The electrical resistance generally varies in proportion to the intensity of the magnetic field and continues to vary as long as this field exists. The variation and resistance may then be utilized to perform a switching operation by employing auxiliary electronic means, such as amplifiers or pulse shapers. Such switching device, however, have the disadvantage that the variation in electrical resistance is continuous and gradual and not abrupt. Also, the ON/OFF ratio of the component in response to the magnetic field is generally too slow and the relatively high cost of such switching devices bars any extensive use of them in industry.

It is therefore the principal object of the present invention to provide a novel and improved magnetic electric switch without any mechanically actuated contacts.

It is another object of the present invention to provide a magnetic electrical switch having a high ON/OFF ratio with a resulting rapid switching action so as to be able to switch electrical energy on and off at the high degree of switch efficiency.

It is an additional object of the present invention to provide a magnetic electric switch having a sufficiently high ON/OFF ratio so that a number of such switches may be connected in series or parallel in order to be actuated simultaneously or successively to function as logic elements.

According to one aspect of the present invention a magnetic electric switch without contacts may comprise a ferromagnetic core which has a rectangular magnetization characteristic. A coil is wound around at least a portion of the core and a permanent magnet is fixedly mounted with respect to the core so as to establish a constant magnetic field which blocks magnetically the core. A driver stage is connected to the coil and generates a pulsed driving current having a pulse-interval ratio greater than 1:1 so that a very low voltage is induced in the coil. A second permanent magnet functions as an actuator for the switching element and is displaceable toward and away from the first permanent magnet. The poles of the second magnet are oppositely disposed from the poles of the first magnet. A switching amplifier is connected to the coil through a diode and a capacitor. The core, coil, first and second permanent magnets constitute a switch element with the second permanent magnet being the switch actuator. Moving this second magnet toward the first magnet will counteract the blocking magnetic field so that a high-pulsed voltage drop occurs in the coil with this drop being sufficient to charge the capacitor through the diode so that the amplifier output is in the ON state. The amplifier output will remain in the ON state until the second permanent magnet switch actuator is moved away from the first magnet so that the core again becomes magnetically blocked.

The switch elements may be connected in series or parallel to the output of the driver stage through a resistor and when so connected they function as logic elements.

Other objects and advantages of the present invention will be apparent upon reference to the accompanying description when taken in conjunction with the following drawings, which are exemplary, wherein.

Proceeding next to the drawings wherein like reference symbols indicate the same parts throughout the various views a specific embodiment and modifications of the present invention will be described in detail.

Figure 1:
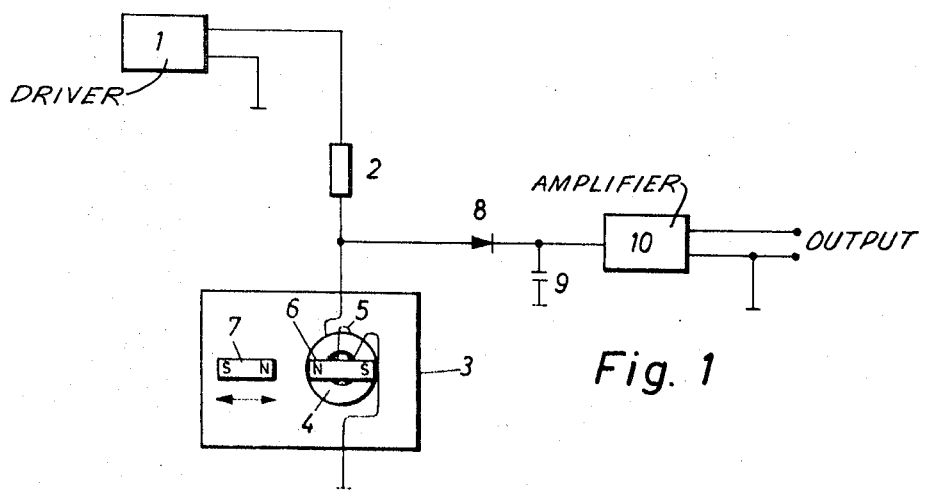
FIG. 1 is an electrical circuit diagram illustrating diagrammatically the magnetic electric switch of the present invention.

As may be seen in FIG. 1, the magnetic electric switch according to the present invention comprises a driver stage 1 which supplies a pulsed current through a resistor 2 to a switch element 3. Also connected to the switch element is a diode 8, a capacitor 9 and a switching amplifier 10 which may also comprise a pulse shaper in which is the output of the present switch.

The driver stage 1 may comprise an alternating current generator supplying a pulsed current consisting of relatively narrow pulses which may be rectangular or sawtooth shaped. The driving current pulses should have a pulse/interval ratio greater than 1:1. A pulse/interval ratio of, for example, 1:15 results in a highly efficient operation of the entire switching arrangement. Such a ratio also reduces power loss in the switch element 3 and at the same time enables the operation of the switch element to occur. Such operation is hindered or even impossible as a result of heat which may be generated in the switch element should the current load be excessive. When narrow rectangular pulses are generated by the driver stage the efficiency of the electrical switch of the present invention will exceed 99.75 percent. The frequency of driver stage 1 may range from several cycles per second up to several hundred kilocycles per second. The uncoupling of the current may be carried out either galvanically or capacitatively.

Figure 2:
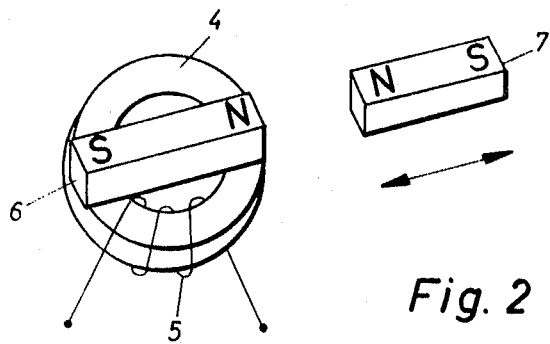
FIG. 2 is a perspective view of the switch element incorporated in the switch of FIG. 1.
Figure 3:
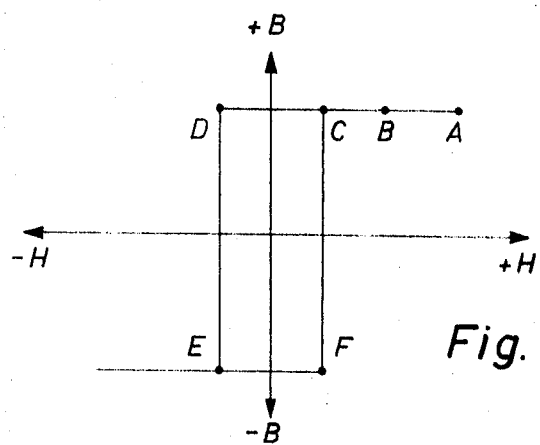
FIG. 3 is a graph showing the magnetization characteristic of the annular core in the switch element of FIG. 2.

The switch element 3 as may be seen in FIG. 2 comprises a ferromagnetic annular core 4 which preferably has a rectangular magnetization characteristic as illustrated in FIG. 3. A coil 5 comprises several turns of wire on the annular core 4. A small rod-shaped permanent magnet 6 is fixedly mounted with respect to the core 4 and coil 5 so that the magnetic field of the magnet 6 extends over at least a portion of the core 4 and the core is thus in a state of magnetic saturation at least in a portion thereof. This state is, in effect, a magnetic blocking of the core.

The magnetization characteristic of core 4 as shown in FIG. 3 represents the ideal characteristic which in practice cannot be obtained but may be closely approached. The state of saturation is indicated schematically at point A. The pulses of driving current supplied by driver stage 1 vary the current in coil 5 and as a result the field intensity H reciprocates between points A and B in response to the driving current pulses. Under these conditions, the pulsed current flowing from driver stage 1 over resistor 2 and through coil 5 will produce no or at best a negligible drop of voltage at the terminals of coil 5 since the relative permeability in the region of points A and B is approximately constant, approaching the value 1, and consequently the apparent resistance of coil 5 becomes very small. Basically, the apparent resistance of coil 5 is dependent on the number of its turns. This very low voltage drop at the terminals of coil 5 represents one state of the switch element 3 and may be designated as the OFF state.

In order to actuate the electric switch disclosed herein an actuating member which may be a permanent magnet 7 is movable toward and away from the switch element as indicated by the arrow in FIG. 2 and is arranged with its poles oppositely disposed with respect to the poles of the magnet 6. The magnet 7 functions to initiate the switching procedure which changes the switch element 3 into its other state which is designated as the ON state. This is accomplished by moving the magnet 7 toward the switch element 3. As the magnet 7 approaches the magnet 6 of the switch element 3 its magnetic field will counteract at least in part the magnetic field of magnet 6. The saturation of core 4 is thus, in effect, removed or compensated and the point on curve 3 is moved approximately from A to C. The core 4 is now in a state of magnetization wherein the steep drop or rise of field intensity/induction characteristic traverses from point C over points D, E, F and then back through C as a result of relatively small variations in the driving current pulses. The annular core 4 is correspondingly subjected to a very rapid periodic switching or reversal as a result of the driving current pulses supplied by the driver stage 1 to the coil 5. This results not only in a simple increase of the resistance of coil 5 but also a higher pulse-shaped voltage drop occurs at the terminals of the coil. When the increase and decrease periods of the driving current pulses are properly selected the value of the voltage drop is substantially a function of the switching properties of the ferromagnetic core 4 and the number of turns of coil 5.

Because of the extremely short switching periods and low switching losses characteristic of an annular core having a rectangular magnetization characteristic, a high pulse-shaped voltage appears on coil 5 with only a small amount of power being required for the driving current pulses. Since the pulse-shaped voltage drop on coil 5 exceeds the threshold voltage of diode 8, capacitor 9 will be charged over diode 8. At the same time, diode 8 prevents the discharge of capacitor 9 in the direction of coil 5 during pulse intervals. The charge on capacitor 9 is then employed for driving switching amplifier 10 which may also include a pulse shaper.

Some of the more important advantages of the magnetic electric switch of the present invention are derived from the fact that the time discharge constant based on the capacitor 9 and the input resistance of amplifier 10 is approximately equal to or only slightly greater than the time interval between two successive pulses of the driving current. The maximum speed at which switching operations of the present switch may be repeated as initiated by the mechanical displacement of the switching magnet 7 is only slightly less than the pulse frequency of driver stage 1. By properly selecting the optimum values for the components of the present switch the surge characteristic of this switch will be represented by a single transition, for example, from point D to E or from F to C of the magnetization curve of FIG. 3 so that an extremely steep switching slope is obtained. Basically, this slope is a function of only the reversal properties of annular core 4 since the charging time constant, which includes the resistance in the flow direction of diode 8 and of capacitor 9, is sufficiently low for charging capacitor 9 during such a transition on the magnetization curve. Further, the switching-on time of amplifier 10 must be sufficiently low with respect to the actual switching-on time of switch element 3 to maintain its state until the next pulse of driving current occurs.

In tests on the switch disclosed as the present invention, power switching ratios of 100,000:1 as well as make and break times less than 300 milliseconds were attained.

Figure 4:
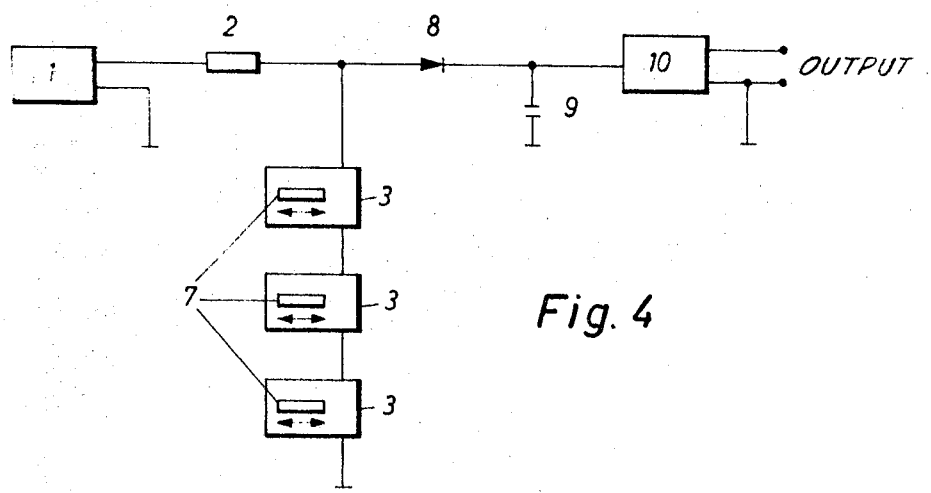
FIG. 4 is an electrical circuit diagram illustrating diagrammatically a plurality of switch elements according to the present invention connected in series.
Figure 5:
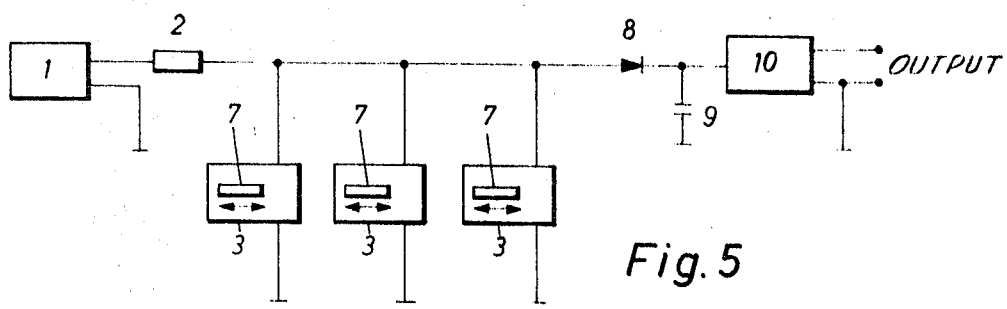
FIG. 5 is a view similar to that of FIG. 4 but showing a plurality of switch elements connected in parallel.

In view of the high on/off ratio which can be attained with the electric switch or of switch element 3 according to the present invention, several switch elements 3 may be connected in series as shown in FIG. 4 or in parallel as shown in FIG. 5. In the series connection of FIG. 4, a switching process will occur at the output of switching amplifier 10 which is common to all of the switch elements 3 when one or more switching magnets 7 are actuated. This arrangement represents an OR logic function.

The parallel arrangement of FIG. 5 will indicate a switching process at the output of switching amplifier 10 which is also common to all of the switch elements 3 only if all of the switch magnets 7 with their respective switch elements 3 are actuated jointly. This arrangement represents an AND logic function.

The switch of the present invention may be considered as a unipolar device when only one switching amplifier is employed and the actuation of one or more switching magnets 7 triggers a switching process only in one circuit. However, the switch may also be utilized in a multipolar form by providing the switch element 3 with two or more coils. Each coil is then supplied from a common driver stage 1 over its respective resistance 2. The switching signals which appear on the coils are then utilized as described above in the arrangement with only one coil so that each coil is connected with its own diode 8, capacitor 9 and switching amplifier 10. With such an arrangement, two or more mutually independent switching amplifiers 10 can be triggered when a single switching magnet 7 is actuated.

Figure 6:
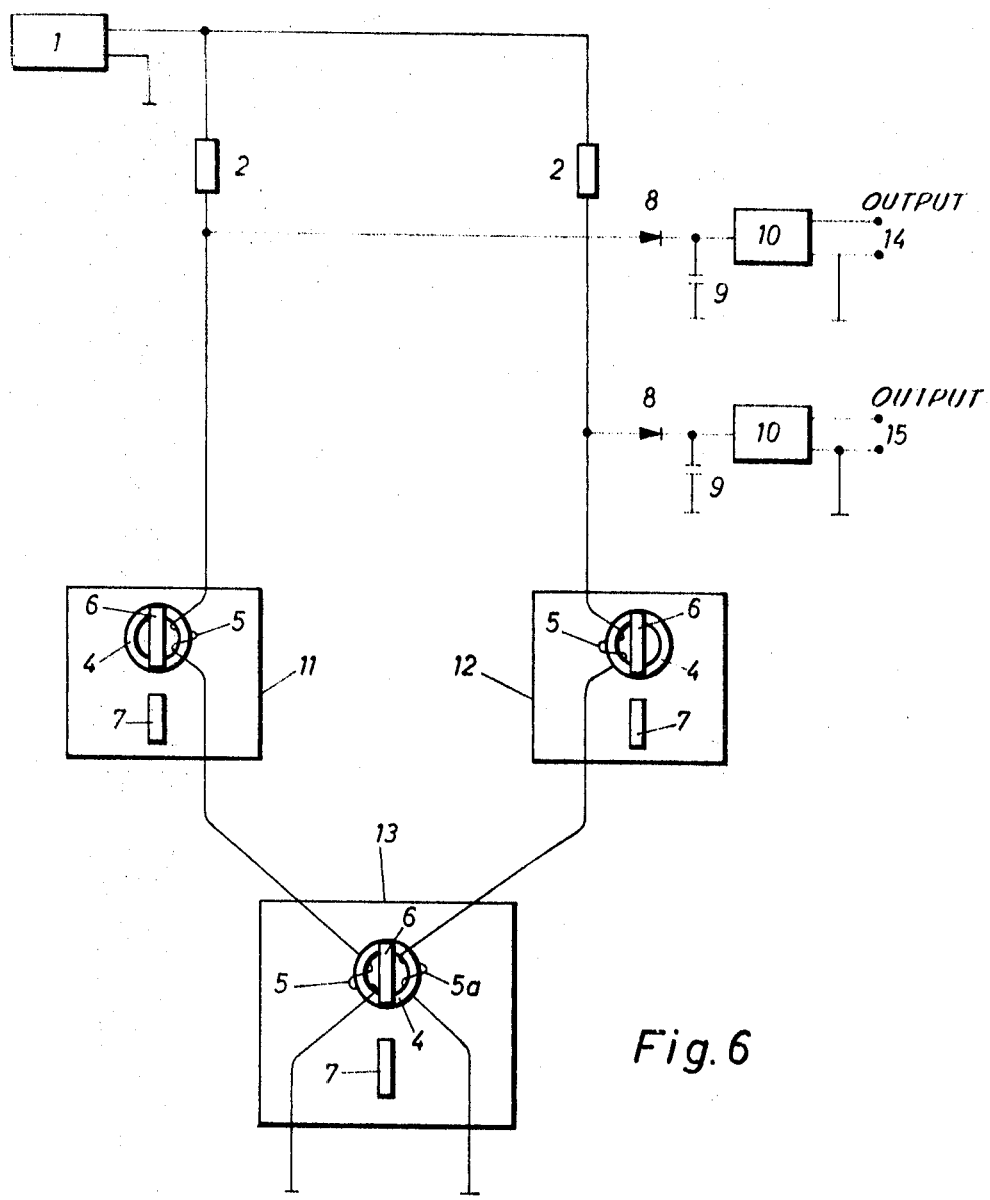
FIG. 6 is an electrical circuit diagram showing diagrammatically a further switching arrangement incorporating the switch elements of the present invention.

In FIG. 6 there is shown a switching arrangement, which may be used for coding purposes, based upon a series or parallel arrangement of switch elements 3 to drive a single amplifier 10 as shown in FIGS. 4 and 5 and on providing a switch element 3 with several coils 5 and 5a so as to drive mutually independent switching amplifiers 10 by actuating a single switching magnet 7. In FIG. 6, switch elements 11, 12 and 13 are supplied with driving current pulses from a common driver stage 1 over series resistors 2. Switch elements 11 and 12 are the same as switch element 3 described above. Switch element 13, however, is provided with an additional coil 5a on the annular core 4 beside coil 5. The switching signals appearing on coils 5 and 5a are utilized as described above through a combination comprising in each case of diode 8, capacitor 9 and switching amplifier 10. It is thus apparent that if switch element 11 is actuated by moving its respective switching magnet 7, a switching process will be indicated at the output 14 of switching amplifier 10. Should switch element 12 be actuated by moving its switching magnet 7, a switching process will be indicated at output 15 of the other switching amplifier 10.

Since coil 5 or 5a is connected in each case with a single switching amplifier 10, outputs 14 and 15 of the switching amplifiers will indicate joint switching processes approximately simultaneously with the actuation of switching magnet 7 associated with switch element 13.

Switch elements according to the present invention and having one or more coils as well as the required number of switching amplifiers may be so connected that a logic linkage may be carried out by means of switching amplifiers 10 as shown in FIG. 6 by connecting several switch elements 12 and 13 so that the outputs of switching amplifiers 10 might indicate numbers in a binary coded decimal code. The switch elements 12, 13 could each have numbers assigned thereto.

Thus it can be seen that the present invention has disclosed a novel and highly effective electric switch which operates magnetically and does not have any contacts. Not only can this switch be used for the straight switching on and off of electrical power but the switch elements may be combined in various arrangements so as to represent logic functions.

It will be understood that the present invention is susceptible to modification in order to adapt to different usages and conditions.

I claim:

1. A magnetic electric switch without contacts and comprising a ferromagnetic annular core having a rectangular magnetization characteristic, a coil around said core, a permanent magnet fixedly mounted with respect to said core and establishing a constant magnetic field blocking magnetically said core, a driver stage connected to said coil and generating a pulsed driving current having a pulse-interval ratio greater than 1:1 so that a very low voltage is induced on said coil, a second permanent magnet displaceable toward and away from said first permanent magnet and having its magnetic poles oppositely disposed from the poles of said first permanent magnet, a diode connected to said coil, a capacitor connected across said diode and said coil and a switching amplifier connected to said diode and having an output, the displacement of said second permanent magnet toward said first permanent magnet counteracting said blocking magnetic field so that a high-pulsed voltage drop occurs in said coil sufficient to charge said capacitor through said diode whereby said amplifier output is in the ON state, said amplifier output remaining in the ON state until said second permanent magnet is displaced away from said first permanent magnet and said core again becomes magnetically blocked.

2. A magnetic electric switch as claimed in claim 1 wherein said core, coil, first and second permanent magnets constitute a switch element, a resistor connected to the output of said driver stage, a plurality of said switch elements connected in series to said driver stage through said resistor, the ON state appearing at the output of said amplifier upon actuating a displaceable switching magnet of the switch element.

3. A magnetic electric switch as claimed in claim 1 wherein said core, coil, first and second permanent magnets constitute a switch element, a resistor connected to the output of said driver stage, a plurality of said switch elements connected in parallel to said driver stage through said resistor, the ON state appearing at the output of said amplifier upon joint actuation of all said switch elements.

4. A magnetic electric switch as claimed in claim 1 wherein there are a plurality of coils on said core and a corresponding plurality of resistors with each coil being connected to said driver stage through a separate resistor, a corresponding plurality of switching amplifiers with each amplifier being connected between a coil and its resistor so that the ON state appears at the outputs of said amplifiers when a switch element is actuated.

5. A magnetic electric switch as claimed in claim 1 wherein said core, coil, first and second permanent magnets constitute a switch element, each core having at least one coil thereon, there being a plurality of resistors connected to said driver stage, said switch elements being connected in series such that the driver stage is connected through a resistor to only one coil on a core, a plurality of diodes and capacitors with a diode and capacitor being connected to between each first coil and its resistor, a corresponding plurality of switching amplifiers connected to said diodes and capacitors with an amplifier indicating the ON state upon actuation of a switch element whose coil is connected to that amplifier.